United States Patent
Bharadwaj et al.

(10) Patent No.: US 10,341,999 B2
(45) Date of Patent: Jul. 2, 2019

(54) METHODS AND APPARATUS FOR MULTIPLEXING TRANSMISSION CONTROL INFORMATION

(71) Applicant: QUALCOMM Incorporated, San Diego, CA (US)

(72) Inventors: Arjun Bharadwaj, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 15/084,286

(22) Filed: Mar. 29, 2016

(65) Prior Publication Data

US 2016/0295559 A1  Oct. 6, 2016

Related U.S. Application Data

(60) Provisional application No. 62/142,965, filed on Apr. 3, 2015.

(51) Int. Cl.
| | |
|---|---|
| H04W 72/04 | (2009.01) |
| H04L 5/00 | (2006.01) |
| H04W 72/12 | (2009.01) |
| H04L 1/16 | (2006.01) |

(52) U.S. Cl.
CPC ......... *H04W 72/042* (2013.01); *H04L 1/1671* (2013.01); *H04L 5/0007* (2013.01); *H04L 5/0053* (2013.01); *H04W 72/1273* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2014/0307612 A1 | 10/2014 | Vermani et al. | |
| 2014/0328249 A1 | 11/2014 | Vermani et al. | |
| 2015/0085766 A1 | 3/2015 | Kim et al. | |
| 2016/0088641 A1* | 3/2016 | Kwon | H04W 72/085 370/329 |

(Continued)

OTHER PUBLICATIONS

International Search Report and Written Opinion—PCT/US2016/024918—ISA/EPO—dated Jun. 22, 2016.

*Primary Examiner* — Saumit Shah
(74) *Attorney, Agent, or Firm* — Paradice and Li LLP

(57) ABSTRACT

Methods and systems for wireless communication are disclosed. In one aspect, a method includes generating device specific transmission control information for each of two devices, transmitting the transmission control information for each device over different frequencies, and transmitting data to each of the devices as part of a communication according to the respective transmission control information. In some aspects, the transmission control information for each device is encoded based on an identifier of the device. For example, in some aspects, an error detection value such as a cyclic redundancy check, is exclusive or'ed with an identifier of the device, such as an AID, PAID, or group identifier. The resulting value is transmitted along with the transmission control information. A device receiving the wireless frame may only be able to decode its own transmission control information, as the decoding is also based on the receiving device's identifier.

21 Claims, 12 Drawing Sheets

(56) References Cited

U.S. PATENT DOCUMENTS

| | | | |
|---|---|---|---|
| 2016/0174200 A1* | 6/2016 | Seok | H04W 72/04 370/329 |
| 2016/0262157 A1* | 9/2016 | Kim | H04B 7/0413 |
| 2017/0135040 A1* | 5/2017 | Park | H04W 52/0225 |
| 2017/0280462 A1* | 9/2017 | Chun | H04L 1/00 |
| 2018/0146458 A1 | 5/2018 | Bharadwaj et al. | |

* cited by examiner

METHODS AND APPARATUS FOR MULTIPLEXING TRANSMISSION CONTROL INFORMATION

CROSS REFERENCE TO RELATED APPLICATIONS

This application claims priority to U.S. Provisional Patent Application No. 62/142,965, filed Apr. 3, 2015 and entitled "METHODS AND APPARATUS FOR MULTIPLEXING TRANSMISSION CONTROL INFORMATION." The disclosure of this priori application is considered part of this application, and is hereby incorporated by reference in its entirety.

FIELD

Certain aspects of the present disclosure generally relate to wireless communications, and more particularly, to methods and apparatus for multiple user communication in a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking, Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

As the volume and complexity of information communicated wirelessly between multiple devices continues to increase, overhead bandwidth required for physical layer control signals continues to increase at least linearly. The number of bits utilized to convey physical layer control information has become a significant portion of required overhead. Thus, with limited communication resources, it is desirable to reduce the number of bits required to convey this physical layer control information, especially as multiple types of traffic are concurrently sent from an access point to multiple terminals. For example, when an access point sends downlink communications to multiple terminals, it is desirable to minimize the number of bits required to control the downlink of all transmissions. Thus, there is a need for an improved protocol for transmissions to and from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages can become apparent from the description, the drawings, and the claims. Note that the relative dimensions of the following figures may not be drawn to scale.

One aspect disclosed is a method of transmitting a wireless frame over a wireless network. The method includes generating a first transmission control information for a first device, generating a second transmission control information for a second device, transmitting the wireless frame, wherein the transmission includes transmitting at least a portion of the first transmission control information over a first frequency range while simultaneously transmitting at least a portion of the second transmission control information over a second frequency range that does not overlap with the first frequency range, transmitting first data to the first device according to the first transmission control information, and transmitting second data to the second device according to the second transmission control information.

In some aspects, the method also includes generating the first transmission control information to indicate a data transmission frequency range for the first device different than the first frequency range; and transmitting the first data to the first device within the indicated data transmission frequency range.

In some aspects, the method also includes generating the wireless frame to perform a multi-user communication using orthogonal frequency division multiple access (OFDMA). In some aspects, the method also includes generating a common transmission control information for the first device and the second device, wherein transmitting the wireless frame further includes simultaneously transmitting the common transmission control information over both the first frequency range and the second frequency range, and transmitting the first data and the second data according to the common transmission control information. In some aspects, the method also includes generating the first transmission control information to define transmission parameters for a third wireless device. In some aspects, the method also includes transmitting a second wireless frame to the first device indicating the first transmission control information is transmitted over the first frequency range. In some aspects, the method also includes generating the first transmission control information in a HE-SIGB field of a preamble of the wireless frame, generating the second transmission control information in the HE-SIGB field of the preamble of the wireless frame, wherein the transmitting comprises transmitting the HE-SIGB field to include the first transmission control information in the first frequency range and the second transmission control information in the second frequency range.

In some aspects, the first frequency range is 20 Mhz wide and the second frequency range is 20 Mhz wide. In some aspects, the method also includes generating a long training field using either a 2× tone plan or a 4× tone plan, wherein transmitting the wireless frame further comprises transmitting the long training field before the first transmission control information and before the second transmission control information within the wireless frame.

Another aspect disclosed is a method of receiving wireless data by a wireless device from a wireless network. The method includes receiving, by the wireless device, a wireless frame including a preamble and a data portion, the preamble comprising a first transmission control information within a first frequency range and a second transmission control information within a second frequency range, and the data portion encoding a first data within a third frequency range and a second data within a fourth frequency range, decoding the first transmission control information to determine whether the wireless device is identified by the first transmission control information; and decoding the first data in response to the decoded first transmission control information identifying the wireless device.

In some aspects, the method also includes decoding the second transmission control information in response to the first transmission control information not identifying the wireless device; and decoding the second data in response to the second transmission control information identifying the wireless device. In some aspects, the method includes determining a frequency range encoding data destined for the wireless device in the data portion based on the decoding of the first transmission control information; and decoding the first data in response to determining the third frequency range encodes data destined for the wireless device.

In some aspects, the first transmission control information is received within the first frequency range and the second transmission control information is received within second frequency range and both are encoded within a HE-SIGB field. In some aspects, the method also includes parsing the second transmission control information based on an identifier of the wireless device to identify transmission control information specific to the wireless device. In some aspects, the method also includes decoding the first transmission control information using a 4× tone plan.

Another aspect disclosed is an apparatus for transmitting a wireless frame over a wireless network. The apparatus includes an electronic hardware processor, an electronic hardware memory, operably connected to the electronic hardware processor, and storing instructions that when executed, cause the electronic hardware processor to: generate a first transmission control information for a first device, generate a second transmission control information for a second device, transmit the wireless frame, wherein the transmission comprises: transmitting at least a portion of the first transmission control information over a first frequency range while simultaneously transmitting at least a portion of the second transmission control information over a second frequency range that does not overlap with the first frequency range, transmitting first data to the first device according to the first transmission control information, and transmitting second data to the second device according to the second transmission control information.

In some aspects, the electronic hardware memory stores further instructions that when executed, cause the electronic hardware processor to: generate the first transmission control information to indicate a data transmission frequency range for the first device different than the first frequency range; and transmit the first data to the first device on the indicated data transmission frequency.

In some aspects, the electronic hardware memory stores further instructions that when executed, cause the electronic hardware processor to generate the wireless frame to perform a multi-user communication using orthogonal frequency division multiple access (OFDMA). In some aspects, the electronic hardware memory stores further instructions that when executed, cause the electronic hardware processor to: generate a common transmission control information for the first device and the second device, wherein transmitting the wireless frame further comprises: simultaneously transmitting the common transmission control information over both the first frequency range and the second frequency range, and transmitting the first data and the second data according to the common transmission control information.

In some aspects, the electronic hardware memory stores further instructions that when executed, cause the electronic hardware processor to generate the first transmission control information to define transmission parameters for a third wireless device.

In some aspects, the electronic hardware memory stores further instructions that when executed, cause the electronic hardware processor to transmit a second wireless frame to the first device indicating the first transmission control information is transmitted over the first frequency range. In some aspects, the electronic hardware memory stores further instructions that when executed, cause the electronic hardware processor to: generate the first transmission control information in a HE-SIGB field of a preamble of the wireless frame; and generate the second transmission control information in the HE-SIGB field of the preamble of the wireless frame, wherein the transmitting comprises transmitting the HE-SIGB field to include the first transmission control information in the first frequency range and the second transmission control information in the second frequency range. In some aspects, the first frequency range is 20 Mhz wide and the second frequency range is 20 Mhz wide.

In some aspects, the electronic hardware memory stores further instructions that when executed, cause the electronic hardware processor to generate a long training field using either a 2× tone plan or a 4× tone plan, wherein transmitting the wireless frame further comprises transmitting the long training field before the first transmission control information and before the second transmission control information within the wireless frame.

Another aspect disclosed is an apparatus for receiving wireless data by a wireless device from a wireless network. The apparatus includes a receiver configured to receive a wireless frame including a preamble and a data portion, the preamble comprising a first transmission control information within a first frequency range and a second transmission control information within a second frequency range, and the data portion encoding a first data within a third frequency range and a second data within a fourth frequency range, a processor, configured to decode the first transmission control information to determine whether the apparatus is identified by the first transmission control information, and decode the first data in response to the decoded first transmission control information identifying the apparatus.

In some aspects, the processor is further configured to decode the second transmission control information in response to the first transmission control information not identifying the wireless device; and decode the second data in response to the second transmission control information identifying the wireless device. In some aspects, the processor is further configured to determine a frequency range encoding data destined for the wireless device in the data portion based on the decoding of the first transmission control information; and decode the first data in response to determining the third frequency range encodes data destined for the wireless device.

In some aspects, the first transmission control information is received within the first frequency range and the second transmission control information is received within the second frequency range and both are encoded within a HE-SIGB field. In some aspects, the processor is further configured to parse the second transmission control information based on an identifier of the wireless device to identify transmission control information specific to the wireless device. In some aspects, the processor is further configured to decode the first transmission control information using a 4× tone plan.

DETAILED DESCRIPTION

Figure 1:
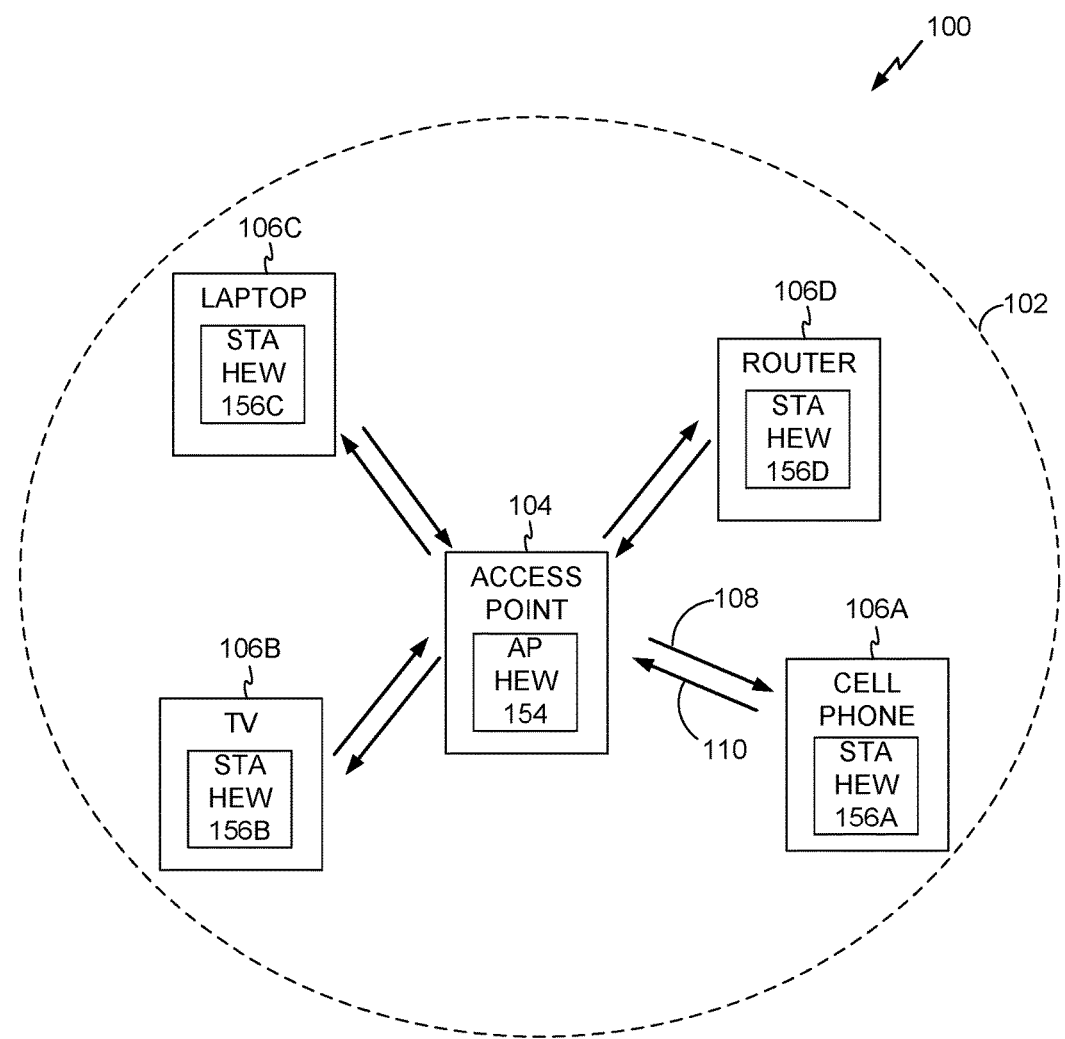
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, function-ality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as WiFi or, more generally, any member of the Institute of Electrical and Electronics Engineers (IEEE) 802.11 family of wireless protocols. For example, the various aspects described herein can be used as part of an IEEE 802.11 protocol, such as an 802.11 protocol which supports OFDMA communications.

It can be beneficial to allow multiple devices, such as stations (STAs), to communicate with an access point (AP) at the same time. For example, this can allow multiple STAs to receive a response from the AP in less time, and to be able to transmit and receive data from the AP with less delay. This can also allow an AP to communicate with a larger number of devices overall, and can also make bandwidth usage more efficient. By using multiple access communications, the AP can be able to multiplex orthogonal frequency division multiplexing (OFDM) symbols to, for example, four devices at once over an 80 MHz bandwidth, where each device utilizes 20 MHz bandwidth. Thus, multiple access can be beneficial in some aspects, as it can allow the AP to make more efficient use of the spectrum available to it.

Multiple access protocols in an OFDM system such as the 802.11 family can be implemented in some aspects by assigning different subcarriers (or tones) of symbols transmitted between the AP and the STAs to different STAs. In this way, an AP could communicate with multiple STAs with a single transmitted OFDM symbol, where different tones of the symbol were decoded and processed by different STAs, thus allowing simultaneous data transfer to multiple STAs. These systems are sometimes referred to as OFDMA systems.

Such a tone allocation scheme is referred to herein as a "high-efficiency" (HE) system, and data packets transmitted in such a multiple tone allocation system can referred to as high-efficiency (HE) packets. Various structures of such packets, including backward compatible preamble fields are described in detail below.

Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some aspects, wireless signals can be transmitted according to an 802.11 protocol. In some implementations, a WLAN includes various devices which are the components that access the wireless network. For example, there can be two types of devices: access points (APs) and clients (also referred to as stations, or STAs). In general, an AP can serve as a hub or base station for the WLAN and an STA serves as a user of the WLAN. For example, an STA can be a laptop computer, a personal digital assistant (PDA), a mobile phone, etc. In an example, an STA connects to an AP via a WiFi compliant wireless link to obtain general connectivity to the Internet or to other wide area networks. In some implementations an STA can also be used as an AP.

An access point (AP) can also include, be implemented as, or known as a base station, wireless access point, access node or similar terminology.

A station "STA" can also include, be implemented as, or known as an access terminal (AT), a subscriber station, a subscriber unit, a mobile station, a remote station, a remote terminal, a user terminal, a user agent, a user device, user equipment, or some other terminology. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured for network communication via a wireless medium.

Methods and apparatus disclosed herein provide for the transmission and reception of wireless frames performing a multi-user communication. The disclosed frames encode device specific transmission control information for a plurality of devices participating in the multi-user communication. In order to improve efficiency of the wireless communication, in some aspects, the transmission control information for one or more devices may be grouped and transmitted over a particular frequency bandwidth, while transmission control information for one or more other devices may be grouped and transmitted simultaneously over a different frequency bandwidth. By multiplexing the transmission control information in this manner, better utilization of the wireless medium may be achieved.

Other aspects may provide improved methods of locating transmission control information for a particular device within a wireless frame. For example, some of the disclosed methods and systems generate or receive a wireless frame that includes a map field. The map field provides an indicator of the location of transmission control information for each device participating in the multi-user communication. Upon decoding the map field, each receiving device is able to locate its respective transmission control information within the frame, thus improving efficiency of processing the received frame. Data for that particular device may then be received based on the located transmission control information.

Other aspects provide for improved methods of encoding and decoding transmission control information. For example, in some aspects, first device specific transmission control information is encoded based on an identifier of the first device. When the transmission control information is received, other devices may be unable to successfully decode it, since they perform decoding based on their own identifier, which is different from the first device's identifier. The first device may be able to successfully decode the transmission control information based on its identifier, which is the same identifier used to encode the information.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g and 802.11b standards. The wireless communication system 100 can operate pursuant to a high-efficiency wireless standard, for example the 802.11ax standard. The wireless communication system 100 can include an AP 104, which communicates with STAs 106A-106D (which can be generically referred to herein as STA(s) 106).

A variety of processes and methods can be used for transmissions in the wireless communication system 100 between the AP 104 and the STAs 106A-106D. For example, signals can be sent and received between the AP 104 and the STAs 106A-106D in accordance with OFDM/OFDMA techniques. If this is the case, the wireless communication system 100 can be referred to as an OFDM/OFDMA system. Alternatively, signals can be sent and received between the AP 104 and the STAs 106A-106D in accordance with code division multiple access (CDMA) techniques. If this is the case, the wireless communication system 100 can be referred to as a CDMA system.

A communication link that facilitates transmission from the AP 104 to one or more of the STAs 106A-106D can be referred to as a downlink 108, and a communication link that facilitates transmission from one or more of the STAs 106A-106D to the AP 104 can be referred to as an uplink 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106A-106D associated with the AP 104 and that use the AP 104 for communication can be referred to as a basic service set (BSS). It can be noted that the wireless communication system 100 may not have a central AP 104, but rather can function as a peer-to-peer network between the STAs 106A-106D. Accordingly, the functions of the AP 104 described herein can alternatively be performed by one or more of the STAs 106A-106D.

In some aspects, a STA 106 can be required to associate with the AP 104 in order to send communications to and/or receive communications from the AP 104. In one aspect, information for associating is included in a broadcast by the AP 104. To receive such a broadcast, the STA 106 can, for example, perform a broad coverage search over a coverage region. A search can also be performed by the STA 106 by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

In an embodiment, the AP 104 includes an AP high efficiency wireless controller (HEW) 154. The AP HEW 154 can perform some or all of the operations described herein to enable communications between the AP 104 and the STAs 106A-106D using the 802.11 protocol. The functionality of the AP HEW 154 is described in greater detail below with respect to FIGS. 4-20.

Alternatively or in addition, the STAs 106A-106D can include a STA HEW 156. The STA HEW 156 can perform some or all of the operations described herein to enable communications between the STAs 106A-106D and the AP 104 using the 802.11 protocol. The functionality of the STA HEW 156 is described in greater detail below with respect to FIGS. 2-11.

Figure 2:
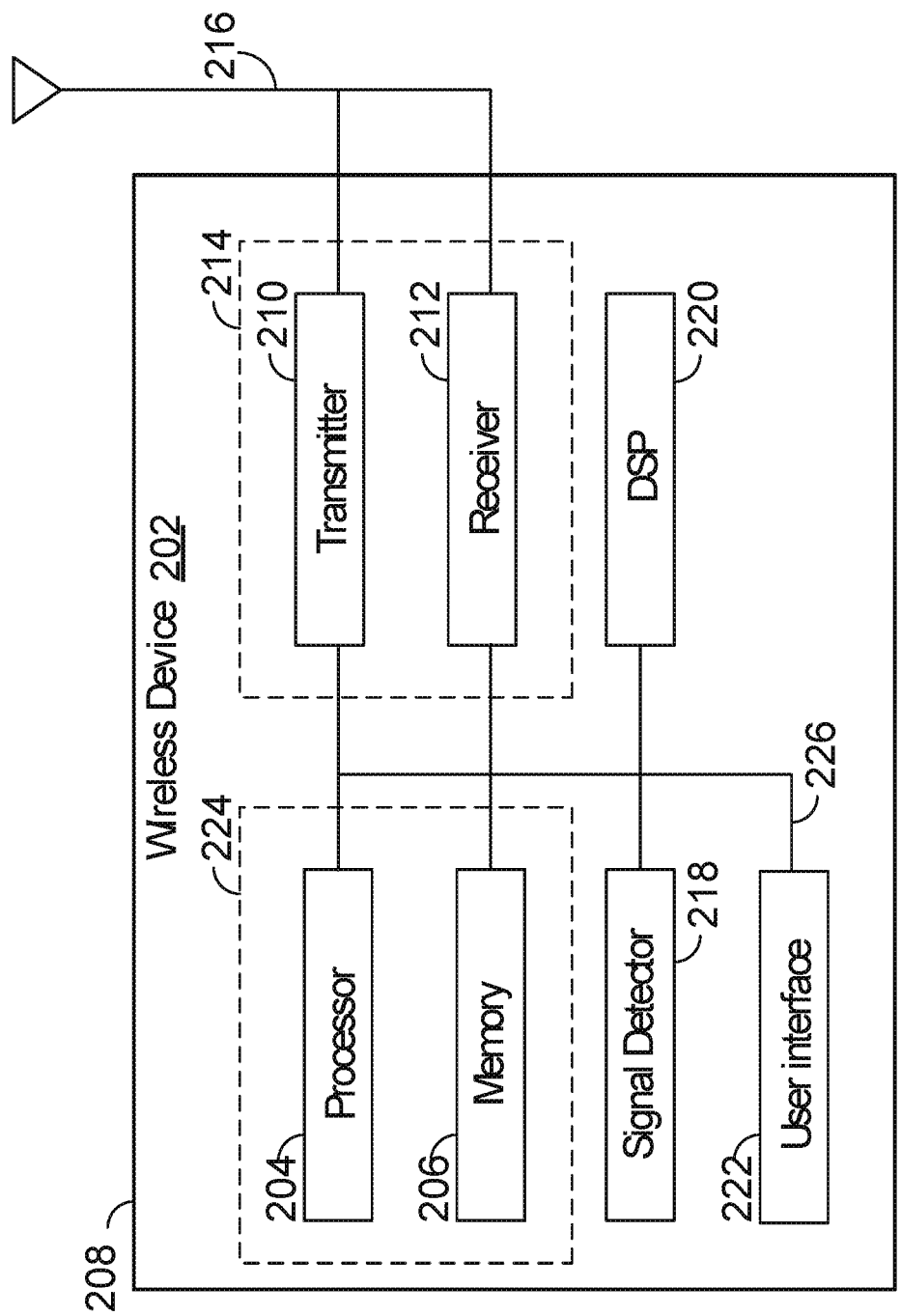
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100 of FIG. 1. The wireless device 202 is an example of a device that can be configured to implement the various methods described herein. For example, the wireless device 202 can include the AP 104 or one of the STAs 106A-106D.

The wireless device 202 can include an electronic hardware processor 204 which controls operation of the wireless device 202. The processor 204 can also be referred to as a central processing unit (CPU) or hardware processor. An electronic hardware memory 206, which can include both read-only memory (ROM) and random access memory (RAM), may store instructions and data and provide them to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processor 204 or the processor 204 and the memory 206 can correspond to the packet generator 124 of FIG. 1, which can be utilized to generate a packet including a value in a packet type field and to allocate a plurality of bits of the packet to each of a plurality of subsequent fields based at least in part on the value in the packet type field, as can be described in more detail below.

The processing system can also include non-transitory machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during multiple-input multiple-output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer protocol data unit (PPDU). In some aspects, the PPDU is referred to as a packet.

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art can appreciate the components of the wireless device 202 can be coupled together or accept or provide inputs to each other using some other mechanism.

Although a number of separate components are illustrated in FIG. 2, those of skill in the art can recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can include the AP 104 or one of the STAs 106A-106D, and can be used to transmit and/or receive communications. The communications exchanged between devices in a wireless network can include data units which can include packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Figure 3:
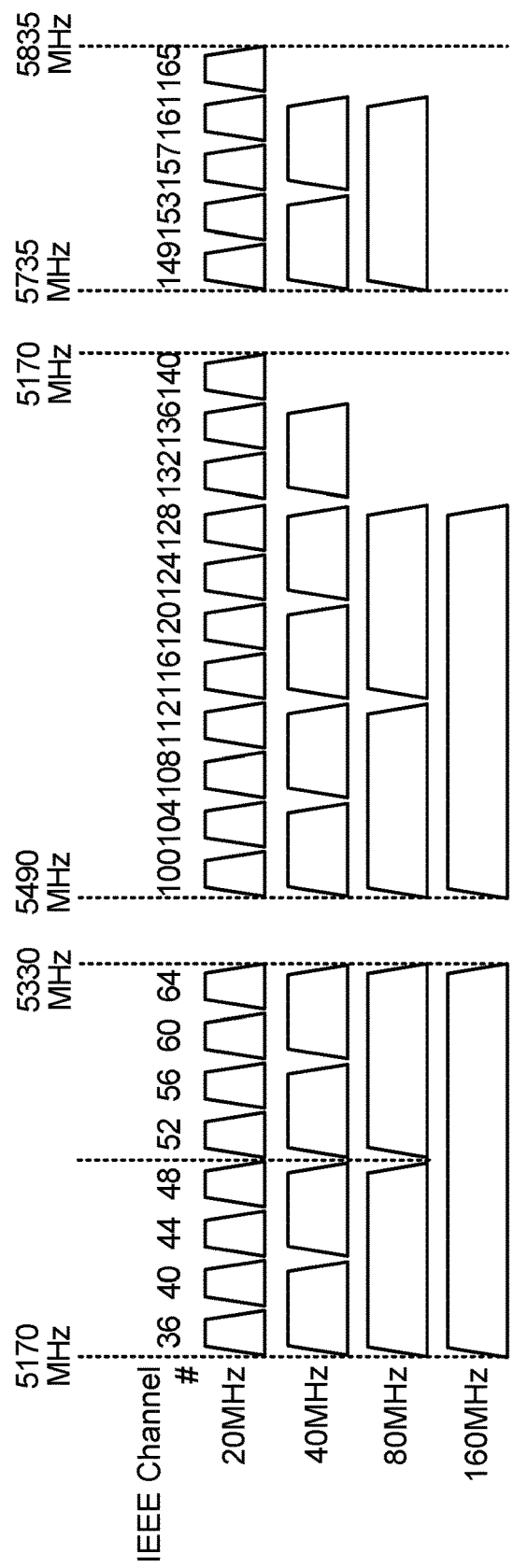
FIG. 3 illustrates a channel allocation for channels available for 802.11 systems.

FIG. 3 illustrates a channel allocation for channels available for 802.11 systems. Various IEEE 802.11 systems support a number of different sizes of channels, such as 5, 10, 20, 40, 80, and 160 MHz channels. For example, and 802.11ac device can support 20, 40, and 80 MHz channel bandwidth reception and transmission. A larger channel can include two adjacent smaller channels. For example, an 80 MHz channel can include two adjacent 40 MHz channels. In the currently implemented IEEE 802.11 systems, a 20 MHz channel contains 64 subcarriers, separated from each other by 312.5 kHz. Of these subcarriers, a smaller number can be used for carrying data. For example, a 20 MHz channel can contain transmitting subcarriers numbered −1 to −428 and 1 to 428, or 56 subcarriers. Some of these carriers can also be used to transmit pilot signals.

Figure 4:
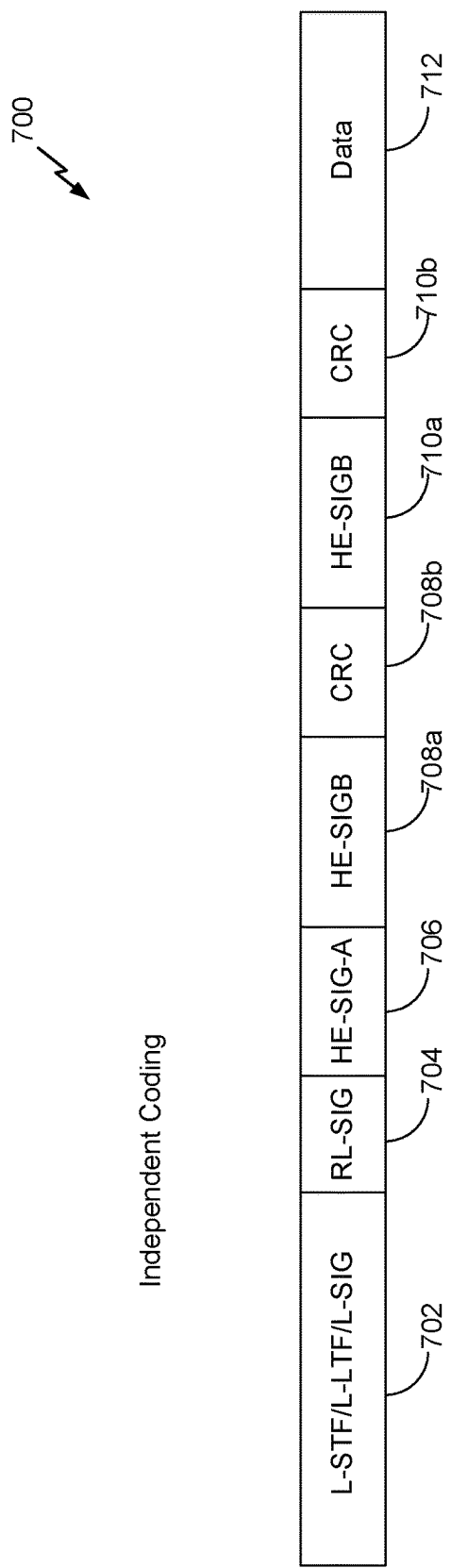
FIG. 4 illustrates an exemplary structure of a physical-layer packet which can be used to enable backward-compatible multiple access wireless communications.

FIG. 4 illustrates an exemplary structure of a physical-layer packet which can be used to enable backward-compatible multiple access wireless communications. This example physical-layer packet includes a legacy preamble 702 including a legacy short training field, legacy long training field, and legacy signal fields. The packet 700 also includes an RL-SIG field 704, and a high efficiency signal A field 706. The packet 700 also includes data 712. Data 712 may include data transmitted using a multi-user mode of transmission, such as by using MU-MIMO or OFDMA.

The packet 700 also includes separate HE-SIGB fields 708a and 710a for each user participating in the multiuser communication occurring in packet 700. In the aspect disclosed in FIG. 7, information for each user of a multi-user transmission is encoded separately, and includes an individual error detection value, such as a cyclic redundancy check (CRC). For example, CRC 708b may correspond to HE-SIGB field 708a, while CRC field 710b may correspond to HE-SIGB field 710a. In some aspects, each of HE-SIGB fields 708a and 710a are transmitted in a primary 20 Mhz channel.

In some aspects of packet 700, each user is allocated a fixed number of bits (code block) in an HE-SIGB field. Each code block may not necessarily align with an OFDMA symbol boundary, in that a code block may span two symbols in some aspects. In some aspects of packet 700 resource allocation for each STA participating in the multi-user communication may be independent of other STAs participating in the multi-user communication.

Some aspects utilizing the packet 700 may signal the location within the packet 700 of a SIGB field for a particular STA using a packet different than packet 700 (not shown). Some other aspects may indicate the location of a SIGB field for a particular STA with data included in the packet 700.

Other aspects utilizing the packet 700 may encode an identifier of a station participating in the multi-user communication with relevant SIGB information for each STA separately. For example, in some aspects, an error detection value, such as a cyclic redundancy check, may be determined for at least a portion of a stations SIGB information. The error detection value may be exclusive or'ed with an identifier for the destination station, and then included in the packet 700, for example, as CRC 808b or 810b. In these aspects, the identifier and the error detection value may have an equivalent number of bits.

When the packet is received by a station, the station may attempt to decode each HE-SIGB field 808a and 810a, based on it's identifier, but only the HE-SIGB field intended for that station will be decoded correctly, given the encoding process used different identifiers for those HE-SIGB fields intended for other stations. In some aspects, the identifier may be a station is or a partial station identifier.

Figure 5:
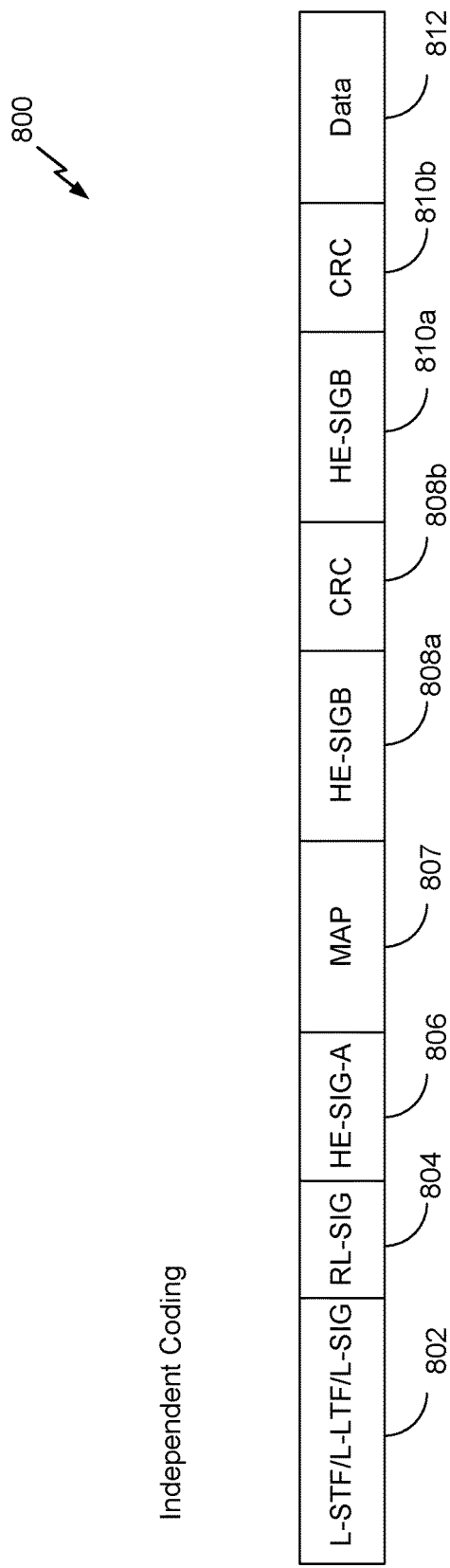
FIG. 5 illustrates an exemplary structure of a physical-layer packet which can be used to enable backward-compatible multiple access wireless communications.

FIG. 5 illustrates an exemplary structure of a physical-layer packet which can be used to enable backward-compatible multiple access wireless communications. The packet 800 is similar to the packet 700 in some respects. The packet 800 includes a legacy preamble 802 including a legacy short training field, legacy long training field, and legacy signal fields. The packet 800 also includes an RL-SIG field 804, and a high efficiency signal A field 806. The packet 800 also includes data 812. Data 812 may include data transmitted using a multi-user mode of transmission, such as by using MU-MIMO or OFDMA.

Similar to packet 700 of FIG. 4, packet 800 also includes a separate SIGB field for each user participating in the multiuser communication occurring in packet 800. These SIGB fields are shown in FIG. 5 as HE-SIGB field 808a and HE-SIGB field 810a. In the aspect disclosed in FIG. 5, information for each user of a multi-user transmission is encoded separately, and includes an individual error detection value, such as a CRC. For example, CRC 808b may correspond to HE-SIGB field 808a, while CRC field 810b may correspond to HE-SIGB field 810a. In some aspects, each of HE-SIGB fields 808a and 810a are transmitted in a primary 20 Mhz channel.

In order for a particular station to identify where in the packet 800 its respective SIGB field is located, packet 800 also includes a map field 807. The map field 807 may provide a mapping from an identifier of a station participating in the multi-user communication to a HE-SIGB location within the packet 800.

Figure 6A:
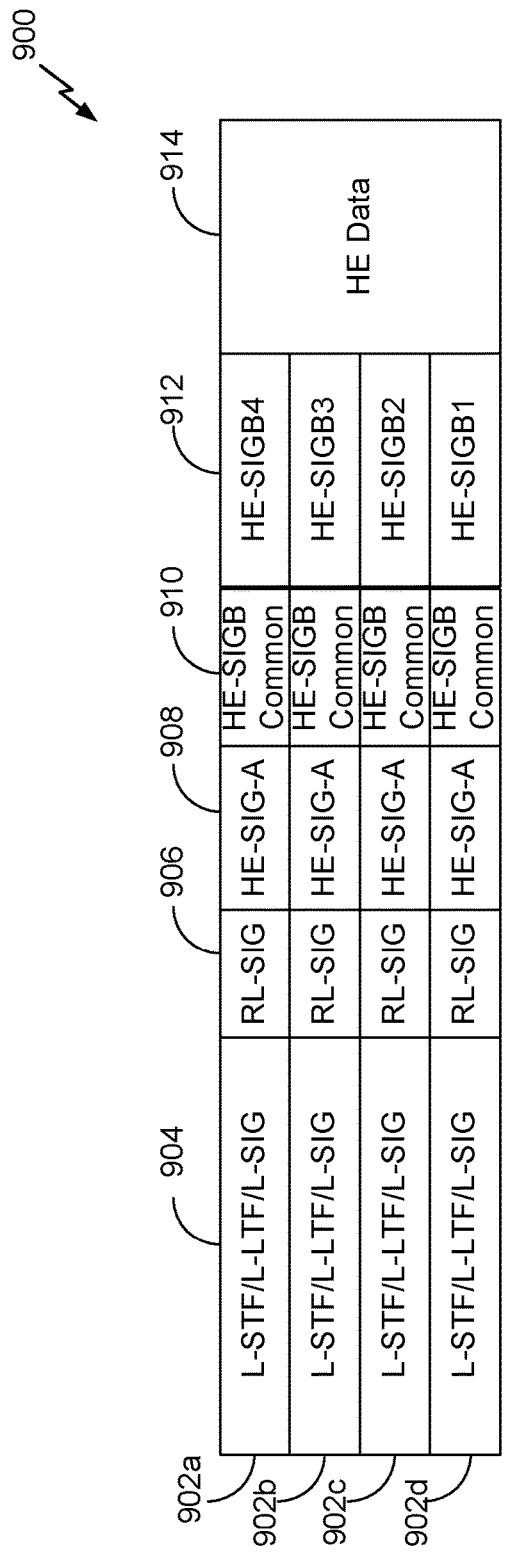
FIG. 6A illustrates an exemplary structure of a physical-layer packet which can be used to enable backward-compatible multiple access wireless communications

FIG. 6A illustrates an exemplary structure of a physical-layer packet which can be used to enable backward-compatible multiple access wireless communications. FIG. 6A shows portions of the packet 900 transmitted within four frequency bands 902a-d. In some aspects, frequency bands 902a-d may correspond to 0-20 Mhz, 20 Mhz-40 Mhz, 40 Mhz-60 Mhz, and 60 Mhz-80 Mhz respectively. FIG. 6A shows that each frequency band 902a-d includes duplicated transmissions of a legacy preamble 904, RL-SIG field 906, HE-SIGA field 908, and HE-SIGB common fields 910. In some aspects, the HE-SIGB common field 910 may include one or more of a downlink/uplink indicator, single user/multi-user indication, data GI and long training field (LTF) compression indicators, padding bits, a number of users indicator. In some aspects, the HE-SIGB common fields 910 may be approximately 10-20 bits in length.

Aspects utilizing packet 900 may also group transmission control information for one or more users into one of frequency bands 902a-902d. For example, in some aspects, transmission control information for up to nine (9) unique users may be transmitted within each of frequency bands 902a-d via HE-SIGB fields 912. In some aspects, a device transmitting the packet 900 may determine which of frequency bands 902a-d have relatively favorable interference characteristics for each STA participating in a multi-user communication occurring as part of packet 900. Thus, a particular STA's SIG-B information may be scheduled within one of frequency bands 902*a-d* with favorable characteristics.

Each of the HE-SIGB common fields 910 within frequency bands 902*a-d* may include information specific to one or more users. The user specific information may include, for example, an indication of the modulation and coding scheme of data transmitted to a user as part of the packet 900, a coding indicator, a number of space time streams indicator (Nsts), space time bock code (STBC) indication, transmit beamforming (TxBF) indications, an identifier of a station/user. In some aspects, the identification may be a partial, group identifier, or other identifier of the station/user. In some aspects, the station identification information may be less than eleven (11) bits in length. Note that in some aspects, data transmitted to a particular user may be transmitted within the same frequency range as a HE-SIGB field 912 that particular user. However, in other aspects, data transmitted to a particular user may be transmitted within a different frequency range than the HE-SIGB field 912 for that particular user.

In some aspects, each of the HE-SIGB fields 912 may include an error detection value, such as a CRC. In some aspects that encode transmission control info for a plurality of users in at least some of the HE-SIGB fields 912, the transmission control info for the plurality of users may be protected by the same error detection value.

Figure 6B:
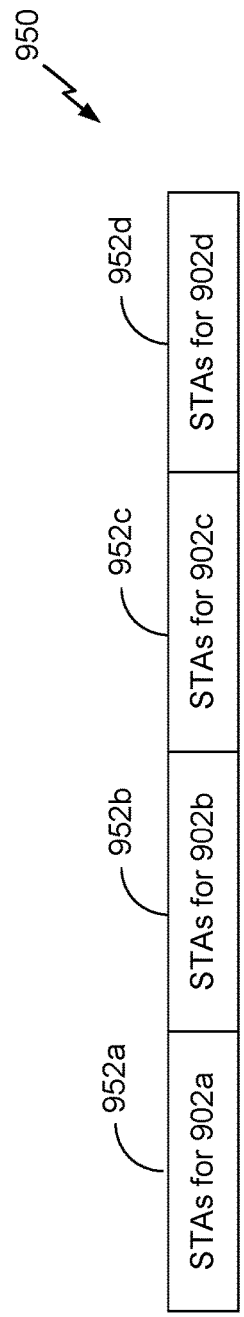
FIG. 6B shows an example implementation of a map field 950 that may be included in the HE-SIGB common fields of FIG. 6A.

FIG. 6B shows an example implementation of a map field 950 that may be included in the HE-SIGB common fields 910 of FIG. 6A. The map field 950 may provide indications of which users or stations have transmission control information within each of the frequency bands 902*a*. (This transmission control information that is specific to each of the users/stations is stored within the HE-SIGB fields 912). As shown in FIG. 6B, the map field 950 is comprised of a plurality of frequency indicator fields 952*a-d*. Each of the frequency indicator fields 952*a-d* may include a list of identifiers of STAs with transmission control information included within the HE-SIGB fields 912 within each of corresponding frequency bands 902*a-d*. By parsing the map field 950, a device receiving the packet 900 may determine which frequency band includes its user specific transmission control information (within HE-SIGB fields 912).

In some other aspects, the map field 950 may not be included within the HE-SIGB common fields 910. In these aspects, separate signaling may be utilized to indicate to a receiving user/station which frequency band of 902*a-d* includes transmission control information specific to that user/station. For example, in some aspects, media access control (MAC) signaling may be used. In these aspects, each STA may only decode a subset of the total bandwidth utilized by the packet 900.

In some other aspects that do not include the map field 950, receiving stations/users may decode each HE-SIGB field 912 within each of frequency bands 902*a-d* in order to determine transmission control information specific to the particular user/station.

Figure 7:
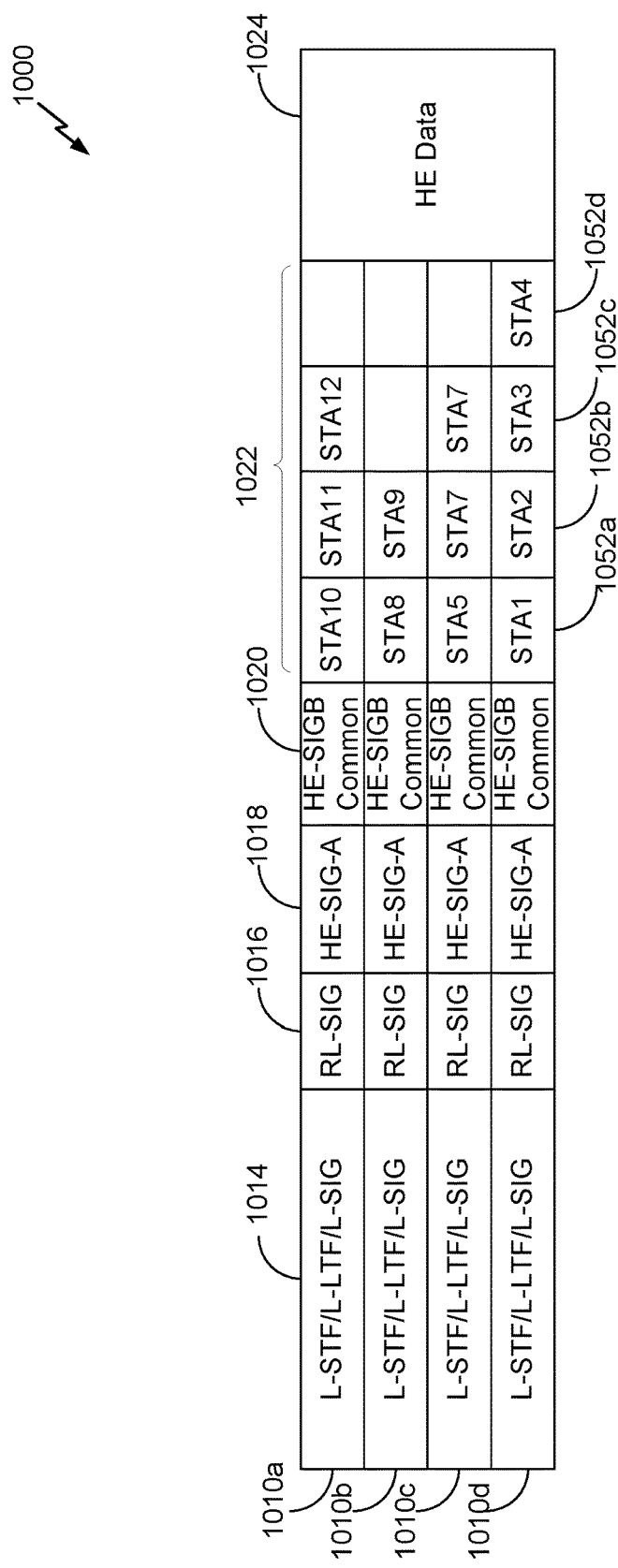
FIG. 7 shows another example implementation of a packet 1000 transmitted across at least four frequency bands.
Figure 8:
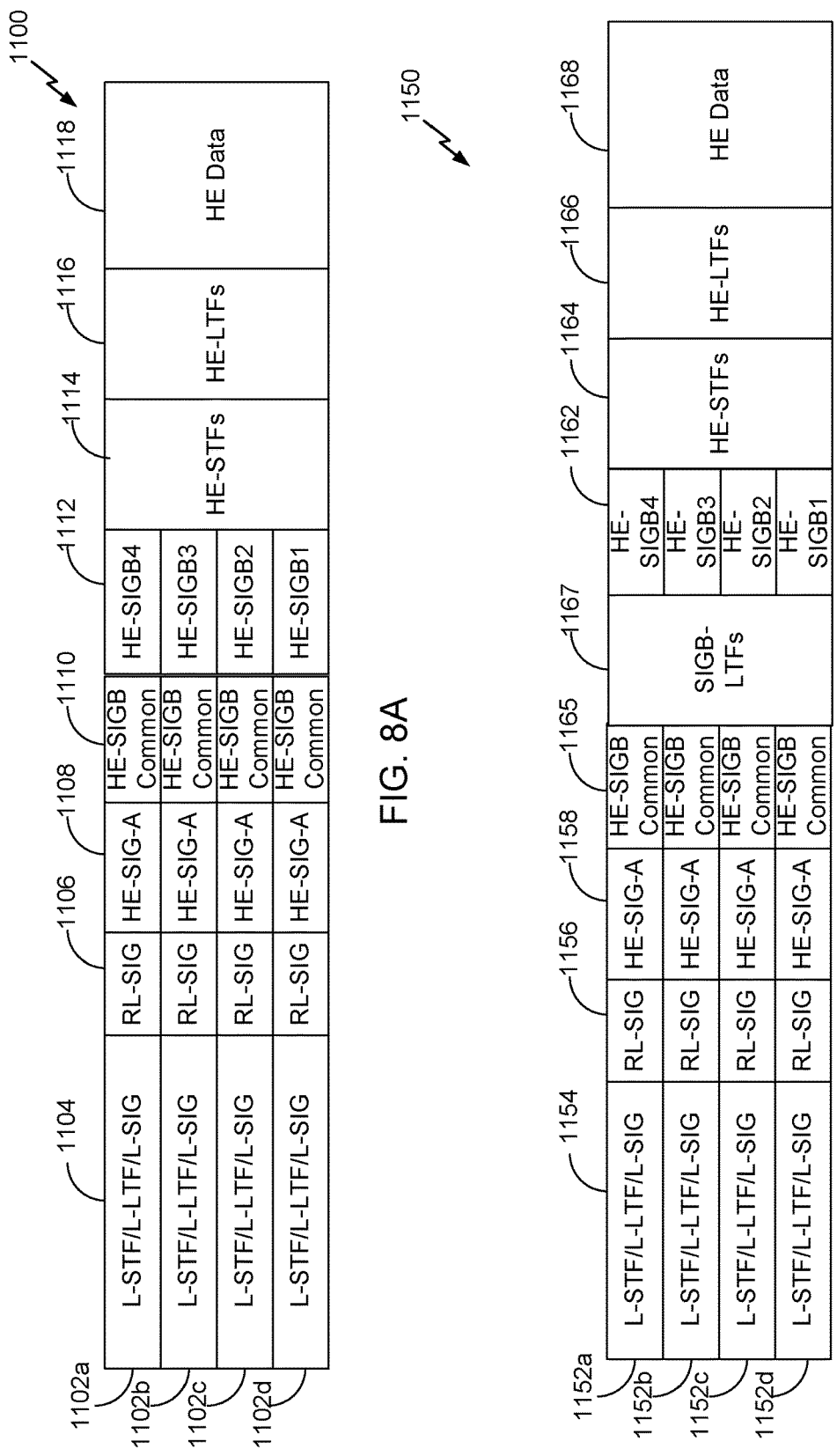
FIG. 8A is an example frame format used in one disclosed implementation.
FIG. 8B is an example frame format used in one disclosed implementation.

FIG. 7 shows another example implementation of a packet 1000 transmitted across at least four frequency ranges 1010*a-d*. In some aspects, each of frequency ranges 1010*a-d* may be 20 Mhz wide. Packet 1000 includes legacy preamble 1014, RL-SIG fields 1016, HE-SIG-A fields 1018, and HE-SIGB Common fields 1020, which are duplicated across each of the frequency ranges 1010*a-d*. As discussed above with respect to FIG. 6A, the HE-SIGB common field 1020 may include information common to all stations users participating in the multi-user communication occurring within packet 1000. In some aspects, the HE-SIGB common field 1020 may include one or more of a downlink/uplink indicator, single user/multi-user indication, data GI and LTF compression indicators, padding bits, a number of users indicator. In some aspects, the HE-SIGB common fields 1020 may be approximately 10-20 bits in length.

Packet 1000 individually encodes user/station specific transmission control information in a device specific portion of an HE-SIGB field 1022, comprised of station/user specific transmission control information fields 1052 for each station/user participating in a multi-user communication of packet 1000. Each of the individual station/user specific transmission control information fields 1052 may include information specific to one or more users. The user specific information may include, for example, an indication of the modulation and coding scheme of data transmitted to a user as part of the packet 1000, a coding indicator, a number of space time streams indicator (Nsts), space time bock code (STBC) indication, transmit beamforming (TxBF) indications, an identifier of a station/user. In some aspects, the identification may be a partial, group identifier, or other identifier of the station/user. In some aspects, the station identification information may be less than eleven (11) bits in length. Note that in some aspects, data transmitted to a particular user may be transmitted within the same frequency range as a station/user specific transmission control information fields 1052 for that particular user. However, in other aspects, data transmitted to a particular user may be transmitted within a different frequency range than the station/user specific transmission control information field 1052 for that particular user.

Each of the station/user specific transmission control information fields 1052*a-d* may include its own error detection value, such as a CRC. The following discussion refers to user specific transmission control information fields 1052*a-d*, but the reader should understand that the discussion applies to all of the station/user specific transmission control information fields 1052 included within the frequency ranges 1010*a-d*. However, indications for user specific transmission control information in frequency range 1010*a-c* have been omitted for figure clarity.

In some aspects, each of the error detection values for station/user specific transmission control information fields 1052*a-d* may be based on a station identifier for the particular station. For example, in some aspects, an intermediate error detection value (CRC) may be exclusive or'ed with an identifier of the station. In some aspects, the error detection value and the identifier are the same number of bits. In these aspects, a receiving station may only be able to successfully decode station/user specific transmission control information fields 1052*a-d* that is intended for it.

In some aspects, a receiving user/station may determine which of frequency bands 1102*a-d* includes its user/station specific transmission control information in a similar manner as discussed above with respect to FIG. 6A. For example, a map field 950 may be included in the packet 1000 in some aspects. Alternatively, a receiving station may receive an indication of the frequency ranges 1010*a-d* that includes its transmission control information via separate MAC signaling. Alternatively, in some aspects, a receiving station may decode each of the station/user specific transmission control information fields 1052 until it is able to successfully decode one of the station/user specific transmission control information fields 1052 based on an identifier of the station/user.

In some aspects, a device transmitting the packet 1000 may organize the location of the station/user specific transmission control information fields 1052 based on user/station specific interference characteristics of the frequency bands 1010*a-d*. For example, stations/users experiencing less interference on one of frequency ranges 1010*a-d* may have their station/user specific transmission control information fields 1052 encoded on that frequency.

As discussed above with respect to FIG. 6A, user/station specific data within data 1024 may or may not be transmitted on the same frequency range 1010*a-d* station/user specific transmission control information fields 1052 for that particular station. The station/user specific transmission control information field 1052 for that particular station may indicate a frequency used for data transmission for that particular station in some aspects.

Note that in some aspects, there may be unequal numbers of STAs assigned to each of frequency ranges 1010*a-d*. This may lead to different SIGB durations in each frequency ranges 1010*a-d*. In some aspects, physical layer panning may be added to data transmitted in one or more of the frequency ranges 1010*a-d* such that the duration of each frequency band is equivalent. In some aspects, HE-SIGB information for a particular STA may be repeated in order to perform the padding.

FIG. 8A is an example frame format used in one disclosed implementation. Similar to the packet 900 and the packet 1000 of FIGS. 6A and 7, packet 1100 shows data transmitted across four frequency bands 1102*a-d*. In some aspects, each frequency band 1102*a-d* may be 20 Mhz wide. For example, frequency band 1102*a* may be 0-20 Mhz, 1102*b* may be 20 Mhz-40 Mhz, 1102*c* may be 40 Mhz-60 Mhz, and 1102*d* may be 60 Mhz-80 Mhz.

Packet 1100 includes a legacy preamble 1104 that includes legacy short and long training fields, as well as a legacy signal field. Packet 1100 also includes an RL-SIG field 1106, HE SIG-A field 1108, HE-SIGB common field 1110, which includes information common to all users/devices participating in a multi-user communication occurring within packet 1100 as described above. As shown each of fields 1106, 1108, and 1110 are duplicated across each of the frequency bands 1102*a-d*. In some aspects, the HE-SIGB common field 1110 may include one or more of a downlink/uplink indicator, single user/multi-user indication, data GI and LTF compression indicators, padding bits, a number of users indicator. In some aspects, the HE-SIGB common fields 1110 may be approximately 10-20 bits in length.

Similar to the HE-SIGB fields 1012 of FIG. 7, packet 1100 also includes HE-SIGB fields 1112. Each of the HE-SIGB fields 1112 includes different transmission control information for different stations participating in a multi-user communication occurring within packet 1100. Each of the HE-SIGB fields 1112 within frequency bands 1102*a-d* may include information specific to one or more users. The user specific information may include, for example, an indication of the modulation and coding scheme of data transmitted to a user as part of the packet 1100, a coding indicator, a number of space time streams indicator (Nsts), space time bock code (STBC) indication, transmit beamforming (TxBF) indications, an identifier of a station/user. In some aspects, the identification may be a partial, group identifier, or other identifier of the station/user. In some aspects, the station identification information may be less than eleven (11) bits in length. Note that in some aspects, data transmitted to a particular user may be transmitted within the same frequency range as a HE-SIGB field 1112 that particular user. However, in other aspects, data transmitted to a particular user may be transmitted within a different frequency range than the HE-SIGB field 1112 for that particular user.

Packet 1100 also includes HE short training fields 1114, HE long training fields 1116, and HE data 1118. In some aspects of packet 1100, the HE-SIGB fields 1112 may be transmitted using a 4× tone plan. With a 4× tone plan, each sub-band is 25% of the sub-bands defined within 802.11ac. Therefore, each symbol duration is 4× longer than that of 802.11 ac. This provides for an 4× increase in the number of tones in each symbol.

Use of a 4× tone plan when transmitting the HE-SIGB4 fields 1112 may provide for an increase in the bandwidth utilized for the HE-SIGB fields 1112 such that it is equivalent to the bandwidth utilized for a PPDU encapsulating packet 1100.

In implementations that utilize packet 1100, channel estimation by a receiver of packet 1100 may include interpolation/extrapolation from legacy long training fields within legacy preamble 1104.

FIG. 8B is an example frame format used in one disclosed implementation. Similar to packets 900 and 1000 of FIGS. 6A and 7, packet 1150 shows data transmitted across four frequency bands 1152*a-d*. In some aspects, each frequency band 1152*a-d* may be 20 Mhz wide. For example, frequency band 1152*a* may be 0-20 Mhz, 1152*b* may be 20 Mhz-40 Mhz, 1102*c* may be 40 Mhz-60 Mhz, and 1152*d* may be 60 Mhz-80 Mhz.

Packet 1150 includes a legacy preamble 1154 that includes legacy short and long training fields, as well as a legacy signal field. Packet 1150 also includes an RL-SIG field 1156, HE SIG-A field 1158, HE-SIGB common field 1165, which includes information common to all users/devices participating in a multi-user communication occurring within packet 1150 as described above. As shown each of fields 1156, 1158, and 1165 are duplicated across each of the frequency bands 1152*a-d*. In some aspects, the HE-SIGB common fields 1165 may include one or more of a downlink/uplink indicator, single user/multi-user indication, data GI and LTF compression indicators, padding bits, a number of users indicator. In some aspects, the HE-SIGB common fields 1165 may be approximately 10-20 bits in length.

Similar to the HE-SIGB fields 1012 of FIG. 7, and 1112 of FIG. 8A, packet 1150 also includes HE-SIGB fields 1162. Each of the HE-SIGB fields 1162 includes different transmission control information for different stations participating in a multi-user communication occurring within packet 1150. Each of the HE-SIGB fields 1162 within frequency bands 1152*a-d* may include information specific to one or more users. The user specific information may include, for example, an indication of the modulation and coding scheme of data transmitted to a user as part of the packet 1150, a coding indicator, a number of space time streams indicator (Nsts), space time bock code (STBC) indication, transmit beamforming (TxBF) indications, an identifier of a station/user. In some aspects, the identification may be a partial, group identifier, or other identifier of the station/user. In some aspects, the station identification information may be less than eleven (11) bits in length. Note that in some aspects, data transmitted to a particular user may be transmitted within the same frequency range as a HE-SIGB field 1162 that particular user. However, in other aspects, data transmitted to a particular user may be transmitted within a different frequency range than the HE-SIGB field 1162 for that particular user.

Packet 1150 also includes SIGB long training fields 1167, HE-Short training fields 1164, HE-long training fields (HE- LTF) 1166, and HE data 1168. In some aspects of packet 1150, the HE-SIGB fields 1162 may be transmitted using a 4× tone plan. With a 4× tone plan, each sub-band is 20% of the sub-bands defined within 802.11ac. Therefore, each symbol duration is 4× longer than that of 802.11ac. This provides for an increase in the number of tones in each symbol.

Use of a 4× tone plan when transmitting the HE-SIGB4 fields 1112 may provide for an increase in the bandwidth utilized for the HE-SIGB fields 1112 such that it is equivalent to the bandwidth utilized for a PPDU encapsulating packet 1100.

In implementations that utilize packet 1150, channel estimation by a receiver of packet 1150 may rely on the HE-LTF 1166. Since the HE-long training fields 1166 occur within the packet 1150 before the HE-SIGB fields 1162, they may be used for channel estimation and assist in receiving the fields 1162 when those fields use a 4× tone plan. In some aspects, the HE-LTF fields may utilize a 2× tone plan. In this case, if the HE-SIGB fields 1162 utilize a 4× tone plan, a receiver may interpolate/extrapolate to estimate the channel for the 4× tone plan. When the HE-LTF fields 1166 utilize the 4× tone plan, no additional interpolation/extrapolation may be necessary when using the resulting channel estimate to receive the HE-SIGB fields 1162.

Figure 9:
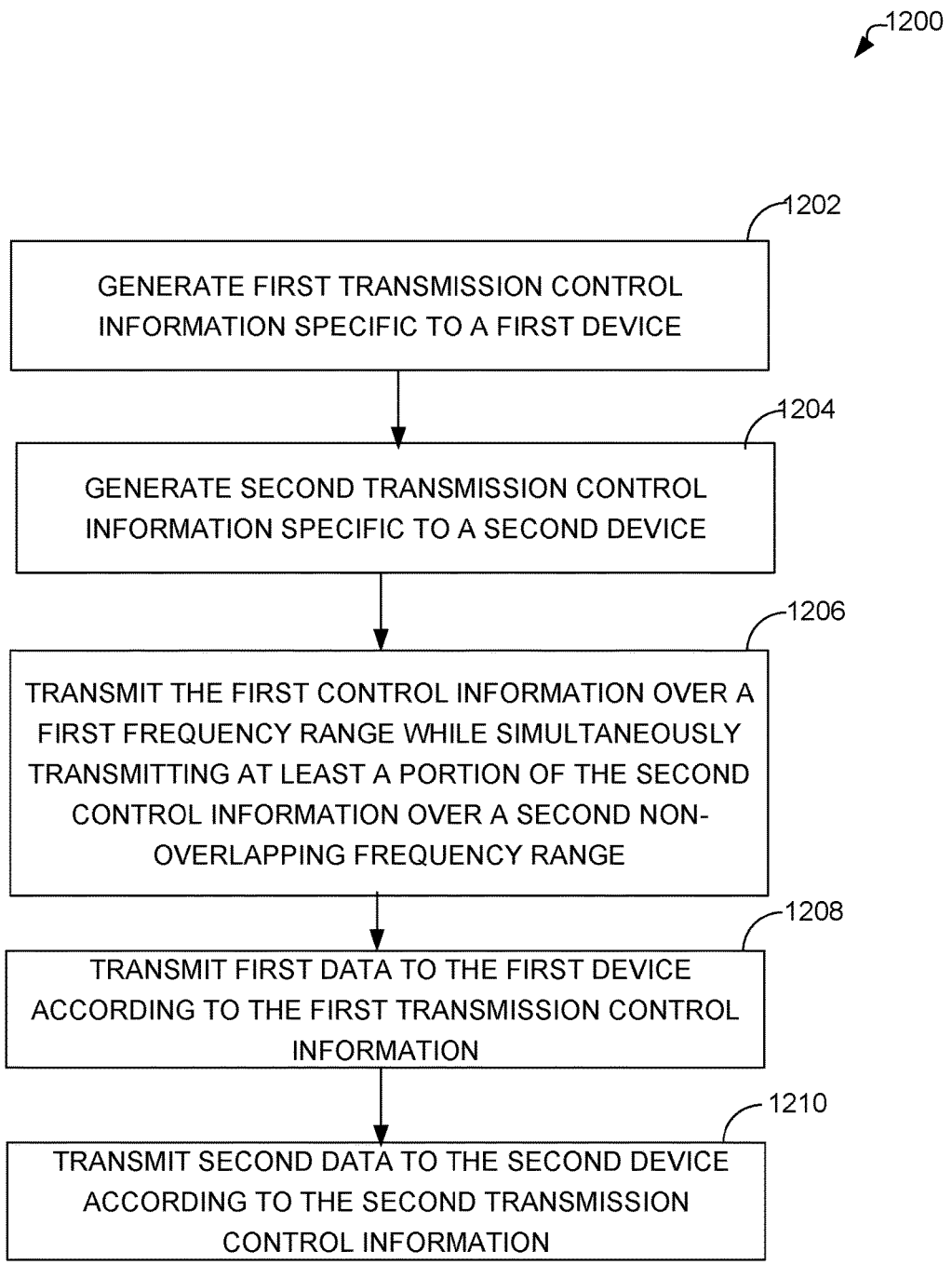
FIG. 9 is a flowchart 1200 for an exemplary method of wireless communication that can be employed within the wireless communication system 120 of FIG. 1.

FIG. 9 is a flowchart for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1 and the packets 900, 1000, 1100, 1150 discussed above with respect to FIGS. 6-8B, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

Method 1200 is a method of transmitting transmission control information to different devices participating in a multi-user communication, for example, via MU-MIMO or OFDMA, over different frequency bandwidths. By multiplexing the transmission control information in this way, bandwidth of a wireless medium may be more efficiently utilized when compared to existing techniques, which generally duplicate the transmission of data relating to transmission control over several bandwidths during a multi-user communication.

In block 1202, first multi-user transmission control information specific to a first device is generated. In some aspects, the first transmission control information may be transmission control information for a multi-user communication, for example, using MU-MIMO or OFDMA. In some aspects, the first multi-user transmission control information may include one or more transmission parameters, such as one or more of an indication of the modulation and coding scheme of data transmitted to a user as part of the packet 900, 1000, 1100, or 1150, a coding indicator, a number of space time streams indicator (Nsts), space time bock code (STBC) indication, transmit beamforming (TxBF) indications, an identifier of a station/user. In some aspects, the identification may be a partial AID, group identifier, or other identifier of the station/user. In some aspects, the station identification information may be less than eleven (11) bits in length. In some aspects, either the first multi-user transmission control information and/or the second multi-user transmission control information may indicate a data channel or data transmission frequency on which a data communication may occur for each of the respective first and second devices.

In some aspects, generating transmission control information for a specific device includes generating an error detection value for intermediate transmission control information. For example, an error detection value may be generated based on the transmission control information, such as one or more transmission parameters, including one or more of the indication of the modulation and coding scheme of data transmitted to a user as part of the packet 900, 1000, 1100, or 1150a coding indicator, a number of space time streams indicator (Nsts), space time bock code (STBC) indication, transmit beamforming (TxBF) indications, an identifier of a station/user. A second error detection value may then be generated based on the error detection value and an identifier for the specific device. In some aspects, the second error detection value is generated by exclusive or'ing the identifier with the first error detection value. In some aspects, this may be facilitated by the fact that the identifier, and the first error detection value have the same bit length. In some aspects, the first error detection value is a cyclic redundancy check value for the first multi-user transmission control information. The transmission control information then includes the second error detection value. By providing an error detection value based on the station identifier, this design provides that only the device with the identifier may be able to successfully decode the transmission control information. In some aspects, block 1202 may be performed by the transmitter 210 and/or the processor 204.

In some aspects, the first multi-user transmission control information is generated to also include transmission control information specific to a third device. For example, in some aspects, the first multi-user transmission control information may include information for both the first and third devices. The first multi-user transmission control information may then be protected via an error detection value, such as a cyclic redundancy check.

In block 1204, second multi-user transmission control information specific to a second device is generated. In some aspects, the second multi-user transmission control information may include one or more of the data described with respect to first multi-user transmission control information above, except that the information will be specific to the second device. In some aspects, the first transmission control information may indicate a data transmission frequency for the first device different than the first frequency range. In some aspects, block 1204 may be performed by the transmitter 210 and/or the processor 204.

In some aspects, the first multi-user transmission control information may encode transmission control parameters for a number of users that is different than a number of users encoded within the second multi-user transmission control information. As a result, the first and second multi-user transmission control information may be of a different length. Since they are transmitted over different frequencies, the shorter field may be padded in some aspects such that the first and second multi-user transmission control information are of an equal length and/or occupy an equal amount of time on the wireless network when transmitted.

In block 1206, a transmission of a wireless frame may be initiated. The transmission of the frame may include transmitting the first multi-user transmission control information over a first frequency range while simultaneously transmitting at least a portion of the second multi-user transmission control information over the second frequency range. For example, as discussed above with respect to FIGS. 6A-8B, the HE-SIG fields 912, 1022, and 1112 may be transmitted over different frequency bandwidths. In some aspects, block 1206 may be performed by the transmitter 210 and/or the processor 204.

In block 1208, first (user) data is transmitted to the first device according to the first multi-user transmission control information. For example, the first data may be transmitted to the first device over a frequency range indicated in the first transmission control information.

In block 1210, second (user) data is transmitted to the second device according to the second multi-user transmission control information. For example, the second data may be transmitted to the second device over a frequency range indicated in the second transmission control information. In some aspects, the transmission control information is transmitted over a different frequency range than the data.

For example, first and second data may be part of a multi-user communication that is accomplished by the transmitted wireless frame. For example, first and second data may be transmitted using MU-MIMO or OFDMA. The multi-user communication may be controlled by the first and second multi-user transmission control information, as well as information included in the wireless frame common to all stations/users participating in the multi-user communication. In some aspects, for example, as discussed above with respect to FIGS. 6A-8B, the HE-SIGB common fields 910, 1020, and 1110 may include one or more of a downlink/uplink indicator, single user/multi-user indication, data GI and LTF compression indicators, padding bits, a number of users indicator. As discussed above with respect to FIGS. 6A-8B, the common transmission control information may be transmitted over both the first frequency range and the second frequency range. In other words, the common transmission control information may be transmitted in duplicate over the two frequency ranges.

In some aspects, method 1200 also includes transmitting a second wireless frame to the first device indicating the first multi-user transmission control information is transmitted over the first frequency range. In some of these aspects, MAC level signaling may be used to indicate to one or more of the STAs participating in the multi-user communication as to where each STAs specific transmission control information is located within the wireless frame. For example, the signaling may indicate one or more of a frequency range over which the station specific transmission control information is transmitted, and/or an offset within the wireless frame where the station-specific transmission control information is located. In some aspects, blocks 1208 and/or 1210 may be performed by the transmitter 210 and/or the processor 204.

In some aspects, the first and second multi-user transmission control information is transmitted using a 4× tone plan. As discussed above with respect to FIG. 8A, in some aspects, legacy short training fields and long training fields may be used for channel estimates. Reception of the transmission control information by a receiving device may be based on these channel estimates. In some aspects, one or more long training fields may be generated using either a 2× or 4× tone plan. The long training field(s) may be transmitted as part of the wireless frame before the first and second multi-user transmission control information within the wireless frame. This may be especially useful when the first and second multi-user transmission control information is transmitted using a 4× tone plan. The long training fields may be used by a receiver to perform a channel estimate and may assist in accurate reception of the transmission control information. In some aspects, the long training fields are generated so as not to include beamforming information. In some aspects, the long training fields are generated with a compression factor equivalent to first and/or second data.

In some aspects, method 1200 includes generating multi-user transmission control information that is common to both the first and second devices. When the frame is transmitted the common multi-user transmission control information may be transmitted in duplicate over both the first and second frequency range. Additionally, the first and second data are transmitted in accordance with the common transmission control information.

Figure 10:
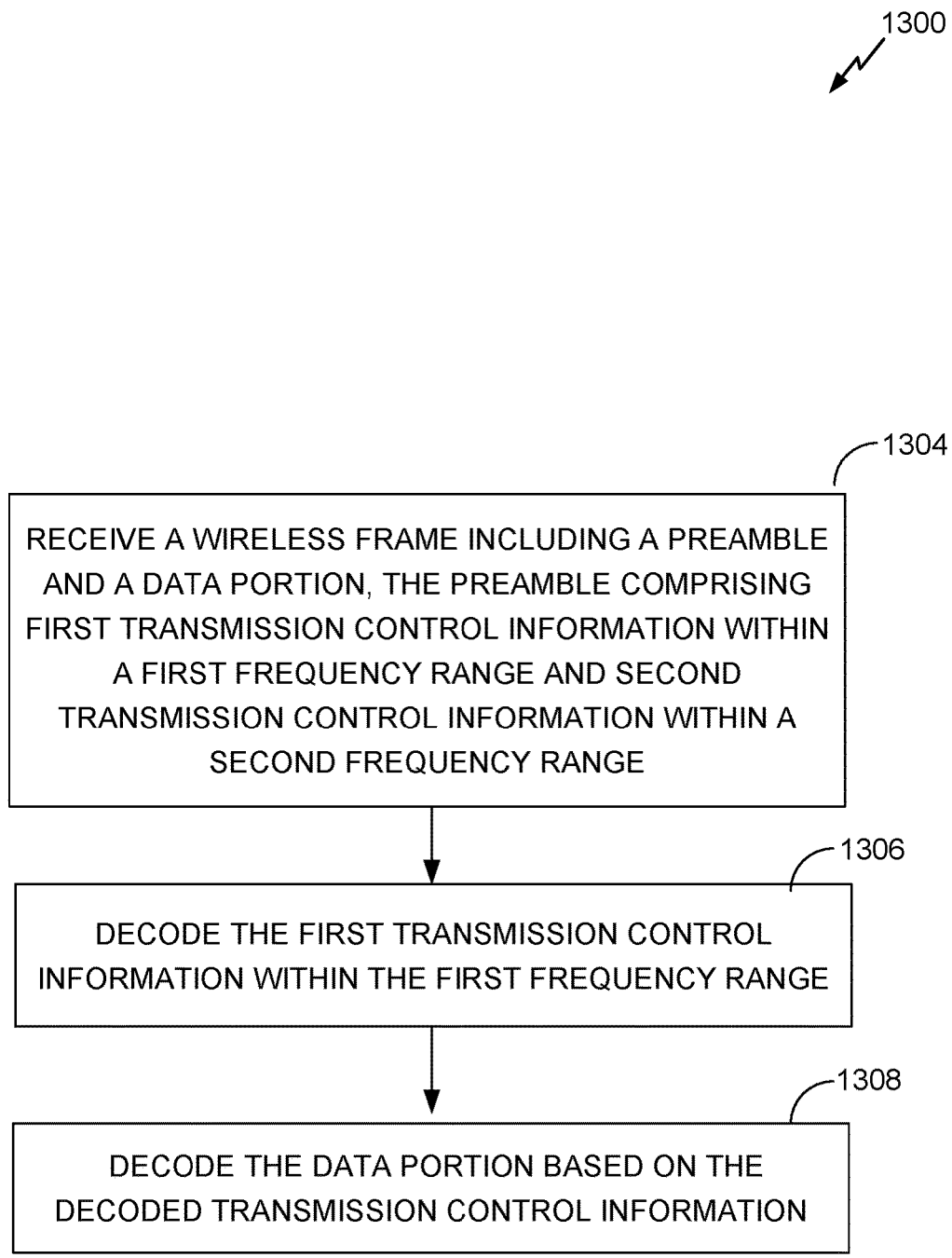
FIG. 10 is a flowchart for an exemplary method of wireless communication that can be employed within the wireless communication system 120 of FIG. 1.

FIG. 10 is a flowchart for an exemplary method of wireless communication that can be employed within the wireless communication system 120 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1 and the packets 900, 1000, 1100, and 1150 discussed above with respect to FIGS. 6A-8B, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

Method 1300 enables a device receiving data during a multi-user communication to receive transmission control information controlling reception of the data during the multi-user communication over a variety of frequencies. By being able to receive the transmission control information over various frequencies, a transmitter of the multi-user communication gains flexibility in allocating transmission frequencies to devices experiencing more optimal channel conditions on those frequencies. Additionally, because transmission control information for different users may be transmitted simultaneously over different frequencies, overall utilization of the wireless medium is improved relative to known techniques.

In block 1304, a wireless frame is received that includes a preamble and a data portion. The preamble includes first transmission control information within a first frequency range and second transmission control information within a second frequency range. In some aspects, the first transmission control information may be first multi-user transmission control information and the second transmission control information may be second multi-user transmission control information. The data portion may encode first data on a third frequency range and second data on a fourth frequency range. In some aspects, the first frequency range may be equivalent to the third frequency range. In some aspects, the second frequency range may be equivalent to the fourth frequency range.

For example, as shown above in any of FIGS. 6A, 7, 8A-B, the various HE-SIGB fields 912, 1022/1052a-d, 1112, and 1162 may be transmitted across a plurality of frequency bands within a single transmission. For example, first transmission control information for a first set of devices may be transmitted within a first frequency range, while second transmission control information may be transmitted within a second, frequency range. The two frequency ranges may not overlap. Each of the plurality of frequency bands may be 20 Mhz wide. For example, the plurality of frequency bands may include 0-20 Mhz, 20 Mhz-40 Mhz, 40 Mhz-60 Mhz, and 60 Mhz-80 Mhz. In some aspects, block 1304 may be performed by the receiver 212 and/or the processor 204.

In block 1306, the first transmission control information is decoded. Decoding may include parsing the wireless frame to identify relevant data portions of the frame used as input for further processing. In some aspects, the decoding is based on an identifier of the device. For example, in some aspects, the decoding may be based on an AID, PAID, or Group ID of the receiving device. For example, an error detection value for the first multi-user transmission control information may be exclusive or'ed with the device identifier. The resulting value may be used to verify the integrity of the first multi-user transmission control information. For example, the resulting value may be a cyclic redundancy check value for the first multi-user transmission control information.

In some aspects, the first transmission control information is decoded using a 4× tone plan. In some aspects, a channel estimate may be determined based on one or more legacy short and/or long training fields included in the received wireless frame. The channel estimate may be interpolated/extrapolated in order to decode the first transmission control information at the 4× tone plan. In some other aspects, one or more long training fields may be decoded from the wireless frames. The long training fields may be using either a 2× tone plan or a 4× tone plan. In embodiments receiving long training fields using a 2× tone plan, additional interpolation/extrapolation may be performed when forming a channel estimate. The channel estimate may be used to receive the transmission control information. In embodiments receiving long training fields using a 4× tone plan, the resulting channel estimate may need less interpolation/extrapolation when used to properly receive the transmission control information using the 4× tone plan. In some aspects, block 1306 may be performed by the processor 204.

In some aspects, multi-user second multi-user transmission control information within the second frequency range is also decoded. For example, if the first transmission control information does not identify the receiving device, the receiving device may decode the second multi-user transmission control information to determine if it is identified there. The second multi-user transmission control information may identify data transmission frequency range(s) for identified devices. In some aspects, decoding includes verifying data within the second transmission control information is consistent with an error detection value, such as a CRC. In some aspects, the error detection value may be exclusive or'ed with an identifier of the device before the resulting value is used to verify the consistency of the second multi-user transmission control information. In some aspects, the decoded transmission control information may then be parsed to identify a portion of the transmission control information that may apply to the receiving device. For example, in some aspects, the received frame may include a map that defines a position within the received frame where transmission control information specific to the receiving device may be found. In some other aspects, information identifying the receiving device may be found preceding its specific transmission control information in the wireless frame.

In block 1308, the data portion is decoded based on the decoded transmission control information. For example, the first and/or second transmission control information may indicate one or more of an indication of a frequency range encoding data transmitted to a user as part of the wireless frame, modulation and coding scheme of data transmitted to a user as part of the wireless frame, a coding indicator, a number of space time streams indicator (Nsts), space time bock code (STBC) indication, transmit beamforming (TxBF) indications, an identifier of a station/user. In some aspects, the identification may be a partial, group identifier, or other identifier of the station/user. In some aspects, block 1308 may be performed by the processor 204.

In some aspects, a wireless message is received indicating a frequency range in which transmission control information is transmitted to the device is the first frequency range. As discussed above with respect to at least FIGS. 6A and 7, separate signaling may be utilized to indicate to a receiving user/station which frequency band of a received wireless frame includes transmission control information specific to the receiving user/station. For example, in some aspects, MAC signaling may be used. In these aspects, each STA may only decode a subset of the total bandwidth utilized by the received wireless frame.

After the data portion is decoded in block 1308, it may be used to perform a variety of functions of the device receiving the wireless frame. For example, in some aspects, portions of the data being decoded in block 1308 may represent video data to be displayed on a screen of the device. By decoding the data portion in block 1308, display of the data on the screen may be provided. In some aspects, portions of the data decoded in block 1308 may represent audio data, such as an audio portion of a cellular telephone call. By decoding the data portion in block 1308, the audio may be played through a speaker of the device, to enable a user on a telephone call to hear another party of the call. In some aspects, at least portions of the data decoded in block 1308 may represent data received in response to web browsing activity by a user of the device. By decoding the data portion in block 1308, the data may be prepared for processing by a web browser. The above description is not intended to imply that block 1308 includes all of the steps required to, for example, display video data, play audio data, or prepare data for a browser. Instead, this is provided to give examples of how the decoding of the data in block 1308 enables the device to perform a variety of functions. Generally, the decoding of data in block 1308 is completed when a message addressed to the receiving device are properly extracted from the received wireless frame and stored in general memory of the receiving device.

Figure 11:
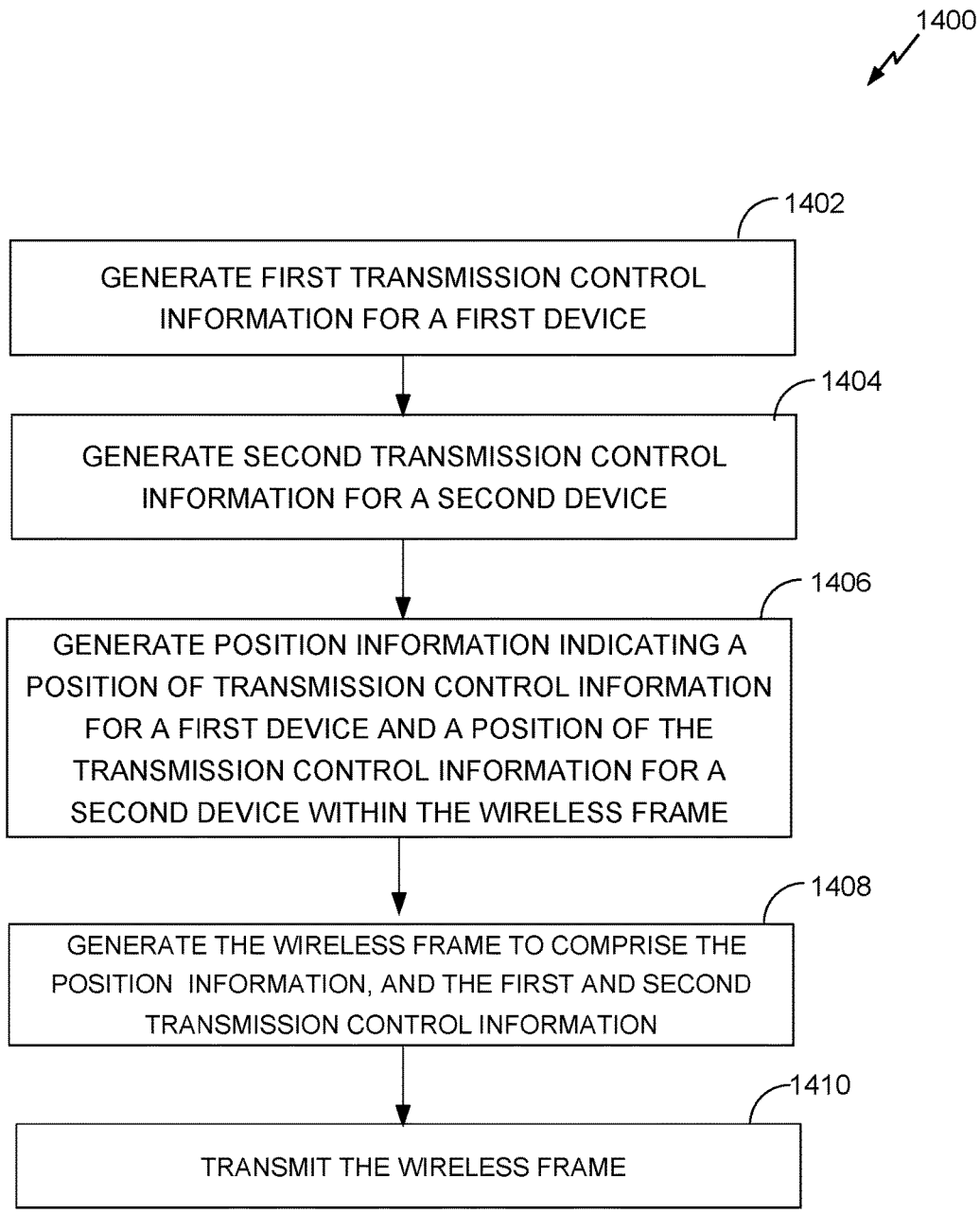
FIG. 11 is a flowchart for an exemplary method of wireless communication that can be employed within the wireless communication system 120 of FIG. 1.

FIG. 11 is a flowchart for an exemplary method of wireless communication that can be employed within the wireless communication system 120 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1 and the packets 900, 1000, 1100, and 1150 discussed above with respect to FIGS. 6A-8B, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

Method 1400 generates and transmits a wireless frame that includes position information for device specific transmission control information included in the frame. For example, a multi-user communication may transmit data to a plurality of devices. Each of those plurality of devices may require device specific transmission control information to support the multi-user communication. The device specific transmission control information for each device may be located at particular offsets within the wireless frame. The position information may provide a directory of where transmission control information for a particular device is located within a frame. When a device receives such a frame, the device may decode the position information to determine where in the frame it should go to find its device specific transmission control information. By providing a position or an index of where the transmission control information for a particular device is located within the frame, processing efficiency may be increased, since a receiving device does not need to search through all of the included transmission control information before identifying its specific transmission control information.

In some aspects, the position information may take the form of a map, which may be a contiguous portion of the frame that identifies particular receiving users/stations and a location of their respective transmission control information.

In some aspects, the position information may be included in a plurality of HE-SIGB fields included in the received frame. In some aspects, the position information may precede the transmission control information in the frame. For example, in some aspects, an identifier of a device may immediately precede transmission control information for that device.

In block 1402, first multi-user transmission control information for a first device is generated. In some aspects, the transmission control information may include one or more of an indication of the modulation and coding scheme of data transmitted to a user as part of the wireless frame (discussed below), a coding indicator, a number of space time streams indicator (Nsts), space time bock code (STBC) indication, transmit beamforming (TxBF) indications, an identifier of a station/user. In some aspects, the identification may be a partial, group identifier, or other identifier of the station/user. In some aspects, the first multi-user transmission control information is generated/encoded within a first HE-SIGB field. In some aspects, first multi-user transmission control information may be generated to include transmission control information for a third device. In some aspects, block 1402 may be performed by the processor 204.

In block 1404, second multi-user transmission control information for a second device is generated. The second multi-user transmission control information may be structured similarly to the first multi-user transmission control information generated in block 1402. In some aspects, the second multi-user transmission control information is generated/included within a second HE-SIGB field. In some aspects, second multi-user transmission control information may also include multi-user transmission control parameters for a fourth device.

In some aspects, each of the first and second multi-user transmission control information may include an error detection value. In some aspects, the error detection values may be based on the corresponding transmission control information. In some aspects, the error detection values may also be based on an identifier of the corresponding device. For example, an error detection value for the first multi-user transmission control information may be based on an identifier of the first device. An error detection value for the second multi-user transmission control information may be based on an identifier for the second device. For example, in some aspects, an identifier of the device may be exclusive or'ed with a CRC for the transmission control information to form the error detection value. In some aspects, the identifier and the error detection value may comprise an equivalent number of bits. In some aspects, block 1404 may be performed by the processor 204.

In block 1406, position information is generated indicating a position of transmission control information for a first device and a position of the transmission control information for a second device within a wireless frame. For example, in some aspects, as discussed above with respect to FIG. 5, the map field 807 may indicate an offset within the wireless frame (discussed below) that provides station specific transmission control information for each station participating in a multi-user communication performed by the wireless frame generated in block 1408 below. In some aspects, block 1406 may be performed by the processor 204. In some other aspects, generating position information may include generating a plurality of HE-SIGB fields to include in a wireless frame. Each HE-SIGB fields may include transmission control information for one or more devices. In some aspects, an identifier of the station is encoded along with the relevant transmission control information.

In block 1408, the wireless frame is generated to comprise the position information, and the first and second multi-user transmission control information. The wireless frame may be generated to perform a multi-user communication to a plurality of destination devices using at least one of MU-MIMO and/or OFDMA. Data for each of the first and second devices included in the multi-user communication may be transmitted in accordance with the information provided in the first and second multi-user transmission control information. In some aspects, block 1408 may be performed by the processor 204.

In block 1410, the wireless frame is transmitted. In some aspects, block 1410 may be performed by the transmitter 210 and/or the processor 204.

Figure 12:
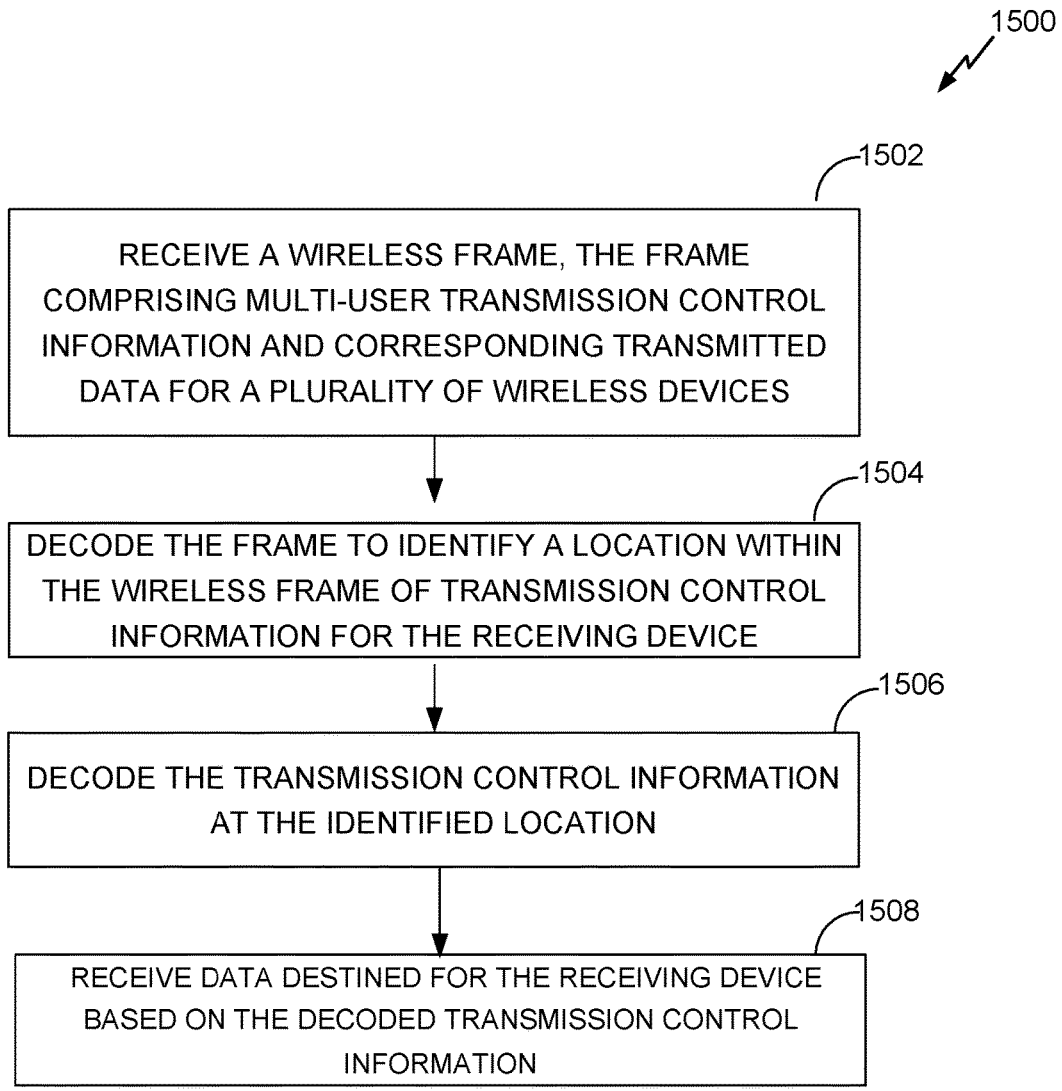
FIG. 12 is a flowchart for an exemplary method of wireless communication that can be employed within the wireless communication system 120 of FIG. 1.

FIG. 12 is a flowchart for an exemplary method of wireless communication that can be employed within the wireless communication system 120 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1 and the packets 900, 1000, 1100, and 1150 discussed above with respect to FIGS. 6A-8B, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

Method 1500 provides for the decoding of a wireless frame that includes map information. The map information indicates to the receiving device where within the frame transmission control information specific to the receiving device may be located. Once located, the receiving device can decode the transmission control information specific for it in order to receive data as part of a multi-user communication performed by the received frame. Because the receiving device does not need to search through the frame for its particular transmission control information, performance may be improved.

In block 1502, a wireless frame is received. The wireless frame includes multi-user transmission control information and corresponding transmitted data for a plurality of wireless devices.

In block 1504 the wireless frame is decoded to identify a location within the wireless frame of multi-user transmission control information for the wireless device. In some aspects, the wireless frame includes map information indicating a position within the frame of transmission control information specific to the receiving device. For example, as discussed above with respect to the example of FIG. 5, the map field 807 may indicate an offset within the received wireless frame where device specific transmission control information may be located. In some aspects, block 1502 may be performed by the processor 204.

In some other aspects, information identifying the receiving device may be found, for example, in one of multiple HE-SIGB fields within the transmission control information. For example, as shown in FIG. 4, the received frame may include multiple HE-SIGB fields, one of which may include information relating to the received device. In some aspects, block 1504 may be performed by the processor 204.

In some aspects, the receiving device may parse through each of multiple HE-SIGB fields until it identifies an HE-SIGB field including transmission control information for the receiving device.

In some aspects, an identifier of a station (such as STA ID or a PID) is encoded within the frame along with relevant SIGB information for the respective STA.

In block 1506, the transmission control information at the identified location is decoded. In some aspects, decoding comprises comparing an error detection value for the transmission control information with a value derived from the transmission control information, such as a cyclic redundancy check.

In some aspects, the transmission control information is decoded based on an identifier of the receiving device. For example, an error detection value may be exclusive or'ed with the identifier of the receiving device to produce a second error detection value, which may be a CRC for the remaining portion of the transmission control information. In some aspects, block 1506 may be performed by the processor 204.

In block 1508, data destined for the receiving device is received based on the decoded transmission control information. For example, the decoded transmission control information may indicate one or more of modulation and coding scheme of data transmitted to the receiving device as part of the wireless frame, a coding indicator, a number of space time streams indicator (Nsts), space time bock code (STBC) indication, transmit beamforming (TxBF) indications, and/or an identifier of a station/user. In some aspects, the identification may be a partial, group identifier, or other identifier of the station/user. In some aspects, block 1508 may be performed by the receiver 212 and/or the processor 204.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), FPGA or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Thus, in some aspects computer readable medium can include non-transitory computer readable medium (e.g., tangible media). In addition, in some aspects computer readable medium can include transitory computer readable medium (e.g., a signal). Combinations of the above can also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it can be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of transmitting a wireless frame over a wireless network, comprising:
    generating a first transmission control information for a first device in a HE-SIGB field of a preamble of the wireless frame, the first transmission control information indicating a first data transmission frequency range for transmitting data following the first transmission control information to the first device;
    generating a second transmission control information for a second device in the HE-SIGB field, the second transmission control information indicating a second data transmission frequency range;
    transmitting the wireless frame, wherein the transmission comprises:
        transmitting at least a portion of the first transmission control information over a first frequency range while simultaneously transmitting at least a portion of the second transmission control information over a second frequency range that does not overlap with the first frequency range,
        transmitting first data to the first device over the first data transmission frequency range according to the first transmission control information, the first data transmission frequency range being different than the first frequency range, and
        transmitting second data to the second device over the second data transmission frequency range according to the second transmission control information.

2. The method of claim 1, further comprising generating the wireless frame to perform a multi-user communication using orthogonal frequency division multiple access (OFDMA).

3. The method of claim 1, further comprising:
    generating a common transmission control information for the first device and the second device, wherein transmitting the wireless frame further comprises:
    simultaneously transmitting the common transmission control information over both the first frequency range and the second frequency range, and
    transmitting the first data and the second data according to the common transmission control information.

4. The method of claim 1, further comprising generating the first transmission control information to define transmission parameters for a third wireless device.

5. The method of claim 1, further comprising transmitting a second wireless frame to the first device indicating the first transmission control information is transmitted over the first frequency range.

6. The method of claim 1, wherein the transmitting comprises transmitting the HE-SIGB field to include the first transmission control information in the first frequency range and the second transmission control information in the second frequency range.

7. The method of claim 6, wherein the first frequency range is 20 Mhz wide and the second frequency range is 20 Mhz wide.

8. An access point comprising:
    a processing system configured to:
        generate a first transmission control information for a first device in a HE-SIGB field of a preamble of a wireless frame, the first transmission control information indicating a first data transmission frequency range for transmitting data following the first transmission control information to the first device,
        generate a second transmission control information for a second device in the HE-SIGB field, the second transmission control information indicating a second data transmission frequency range; and
    a transmitter configured to transmit the wireless frame, wherein transmitting the wireless frame comprises:
        transmitting at least a portion of the first transmission control information over a first frequency range while simultaneously transmitting at least a portion of the second transmission control information over a second frequency range that does not overlap with the first frequency range,
        transmitting first data to the first device over the first data transmission frequency range according to the first transmission control information, the first data transmission frequency range being different than the first frequency range, and
        transmitting second data to the second device over the second data transmission frequency range according to the second transmission control information.

9. The access point of claim 8, wherein the processing system is further configured to generate the wireless frame to perform a multi-user communication using orthogonal frequency division multiple access (OFDMA).

10. The access point of claim 8, wherein the processing system is further configured to:
    generate a common transmission control information for the first device and the second device, and
    wherein the transmitter is further configured to:
    simultaneously transmit the common transmission control information over both the first frequency range and the second frequency range, and
    transmit the first data and the second data according to the common transmission control information.

11. The access point of claim 8, wherein the processing system is further configured to generate the first transmission control information to define transmission parameters for a third wireless device.

12. The access point of claim 8, wherein the transmitter is further configured to transmit a second wireless frame to the first device indicating the first transmission control information is transmitted over the first frequency range.

13. The access point of claim 8, wherein the transmitter is further configured to transmit the HE-SIGB field to include the first transmission control information in the first frequency range and the second transmission control information in the second frequency range.

14. The access point of claim 13, wherein the first frequency range is 20 Mhz wide and the second frequency range is 20 Mhz wide.

15. An apparatus for wireless communication comprising:
a processing system configured to:
generate a first transmission control information for a first device in a HE-SIGB field of a preamble of a wireless frame, the first transmission control information indicating a first data transmission frequency range for transmitting data following the first transmission control information to the first device;
generate a second transmission control information for a second device in the HE-SIGB field, the second transmission control information indicating a second data transmission frequency range; and
output the wireless frame for transmission, wherein outputting the wireless frame for transmission comprises:
outputting at least a portion of the first transmission control information for transmission over a first frequency range while simultaneously outputting at least a portion of the second transmission control information for transmission over a second frequency range that does not overlap with the first frequency range;
outputting first data for transmission to the first device over the first data transmission frequency range according to the first transmission control information, the first data transmission frequency range being different than the first frequency range; and
outputting second data for transmission to the second device over the second data transmission frequency range according to the second transmission control information.

16. The apparatus of claim 15, wherein the processing system is further configured to generate the wireless frame to perform a multi-user communication using orthogonal frequency division multiple access (OFDMA).

17. The apparatus of claim 15, wherein the processing system is further configured to generate a common transmission control information for the first device and the second device, and wherein outputting the wireless frame for transmission further comprises:
simultaneously outputting the common transmission control information over both the first frequency range and the second frequency range, and
outputting the first data and the second data according to the common transmission control information.

18. The apparatus of claim 15, wherein the processing system is further configured to generate the first transmission control information to define transmission parameters for a third wireless device.

19. The apparatus of claim 15, wherein the processing system is further configured to output a second wireless frame to the first device indicating the first transmission control information is transmitted over the first frequency range.

20. The apparatus of claim 15, wherein the processing system is further configured to output the HE-SIGB field to include the first transmission control information in the first frequency range and the second transmission control information in the second frequency range.

21. The apparatus of claim 15, wherein the first frequency range is 20 Mhz wide and the second frequency range is 20 Mhz wide.

* * * * *